UNITED STATES PATENT OFFICE.

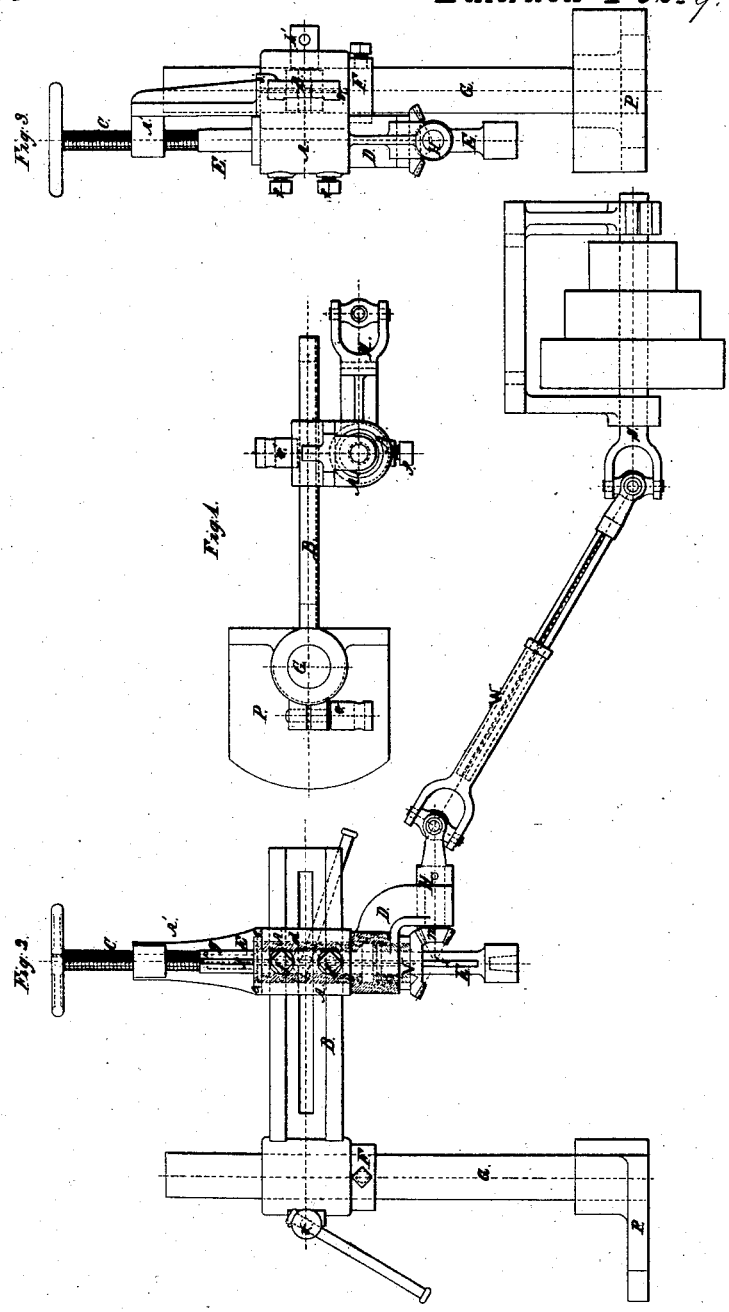

ISAAC S. LAUBACK, OF NEW YORK, N. Y.

IMPROVEMENT IN MACHINES FOR DRILLING IRON.

Specification forming part of Letters Patent No. 41,516, dated February 9, 1864.

*To all whom it may concern:*

Be it known that I, ISAAC S. LAUBACK, of the city and county and State of New York, have invented certain new and useful Improvements in Portable Drilling-Machines; and I do hereby declare the following to be a full, clear, and exact description of the same, reference being had to the annexed drawings, making part of this specification, in which—

Figure 1 is a plan or top view, Fig. 2 a side elevation, and Fig. 3 a front elevation.

The object of my invention is to provide mechanics with a portable drilling-machine which will be more efficient as a hand-machine, and to which steam or other power may be applied, either on a line with the axis of the driving-shaft or at an angle with it, through the agency of universal joints on a self-adjusting connecting-rod. This object I accomplish by constructing a drilling-machine in the following manner, that is to say:

I first make a base-piece. (Represented in the drawings by P.) In this I fit an upright shaft or standard, G. On this standard I fit a clamp-socket with an arm, B, projecting at right angles with said standard. Said socket is clamped on said standard by means of a clamp-screw, $v$, and supported when unclamped by means of a collar, F, by which the said arm can be moved around said standard on a horizontal plane without falling, and without being held up by the attendant or operator. To the arm B, I accurately fit the head A by means of jaws $i\ i$, cast on the back side thereof, and cut to span snugly and yet slide freely on said arm. I then introduce a clamp-screw, $v'$, through a slot cut in said arm into the back side of said head, by means of which the said head is adjusted at any given point on the arm. In the front side of said head I make a socket, into which an arm, $d$, is introduced, which arm I hold in said socket by means of a collar, $e$, fitted to the top thereof, so as to leave said arm free to turn in said socket in either direction on a horizontal plane. Said arm I make with a curved bracket, D, on its lower end, for the purpose of carrying the driving-shaft H, which I make to pass through a socket in the lower end of said bracket in the manner shown.

Through the arm $d$, I make the drill-spindle E pass. Said drill-spindle I move up and down by means of the screw C, to which I unite it at $g$ by means of a groove cut around the end of said screw, and pins passed through said spindle in said groove, by which the said spindle and screw can rotate independently of each other. The lower end of the arm $d$, I bore out around said spindle to receive the hub of the wheel V, through which said spindle passes in the manner shown. Said wheel V I hold in its place by means of a set-screw, which passes through the head and reaches into a groove cut around the upper end of the hub of said wheel. Said wheel V, I fit with a "feather" to match the groove $j$, cut in the periphery of the spindle along its entire length and on a line with its axis, by which said spindle is enabled to rise and fall without disturbing or jamming said wheel V. The screw C, I make to pass through a screw-socket, A', made on the upper end of a vertical projection raised on the upper side of the main head A.

To operate my machine, the power is applied to the shaft H, which conveys it to the spindle through the agency of the bevel-wheels $n$ and V, and the feather in the last-mentioned wheel, which matches in groove $j$, cut in said spindle, as before described. It will be seen that the arm B swings around on the standard G, and that the head A can move to and fro on the arm B, and that the bracket D swings around the spindle E, by which means it will be seen that while the standard remains stationary the spindle can be made to drill a hole anywhere within reach of the arm, and at the same time keep the axis of the driving-shaft on the same plane with the axis of the self-adjusting connecting-rod W. To illustrate this—suppose the connection to be made between the machine and the driver S, as shown in the drawings—that is to say, with the axis of the shafts H and W on the same vertical plane. The machine arranged thus will work well through the agency of the universal connections at each end of the shaft W; but if the arm B be swung around and the bracket D were stationary, so as to put the two shafts on different vertical as well as different horizontal planes, the machine would not work. This difficulty, however, I have overcome by making the bracket D, which carries the driving-shaft of the machine, loose, so that when the arm B is thrown in one direction the bracket D can be moved in the opposite one, or in the same direction, as the case may require, so as to always keep the driver H on the same vertical plane with the rod W, the bracket being secured in any desired position by means of set-screws $f f$, which pass through the head and bear against the arm $d$, as shown.

The advantages of this machine consist, first, in supporting the drill-spindle in the adjustable head A so that it cannot drop down when the hole is drilled through, and, second, in placing the support of the driving-gear in the main adjustable head A, and in making the said support adjustable in said head, so that the driving-shaft H can be adjusted on the same vertical plane with the bar W, while at the same time it is held up by the head A.

These advantages comprise my invention.

What I claim, therefore, and desire to secure by Letters Patent, is—

1. The combination of the drill-spindle E, screw C, socket $d$, adjustable head A, and set-screws $f f$, or their equivalents, the whole constructed substantially as described.

2. The combination of the adjustable arm D with the adjustable head A and set-screws $f f$, substantially as described.

ISAAC S. LAUBACK.

Witnesses:
   AMOS BROADNAX,
   ED ULLMANN.